US008243989B2

(12) United States Patent
Vendrig

(10) Patent No.: US 8,243,989 B2
(45) Date of Patent: Aug. 14, 2012

(54) COLLABORATIVE TRACKING

(75) Inventor: Jeroen Vendrig, Liberty Grove (AU)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 12/334,129

(22) Filed: Dec. 12, 2008

(65) Prior Publication Data

US 2009/0169053 A1 Jul. 2, 2009

(30) Foreign Application Priority Data

Dec. 20, 2007 (AU) ................................ 2007254600

(51) Int. Cl.
*G06K 9/00* (2006.01)

(52) U.S. Cl. ........................ 382/103; 348/169; 342/90

(58) Field of Classification Search .................. 382/100, 382/103, 106, 107; 348/135, 154, 155, 156, 348/157, 169–172; 342/89, 90
See application file for complete search history.

(56) References Cited

U.S. PATENT DOCUMENTS

| 6,542,621 B1 * | 4/2003 | Brill et al. ...................... 382/103 |
| 6,922,632 B2 | 7/2005 | Foxlin ............................ 701/207 |
| 6,925,382 B2 | 8/2005 | Lahn .............................. 701/223 |
| 6,967,612 B1 * | 11/2005 | Gorman et al. .................. 342/22 |
| 6,987,883 B2 | 1/2006 | Lipton et al. .................. 382/173 |
| 8,010,658 B2 * | 8/2011 | Khosla et al. .................. 709/224 |
| 8,050,453 B2 * | 11/2011 | Yang et al. ..................... 382/103 |
| 2003/0197720 A1 | 10/2003 | Moon et al. .................... 345/716 |
| 2006/0262959 A1 | 11/2006 | Tuzel et al. |
| 2007/0291984 A1 * | 12/2007 | Yang et al. ..................... 382/103 |
| 2008/0129581 A1 * | 6/2008 | Douglass et al. ............... 342/52 |

OTHER PUBLICATIONS

Kalman, R.E., "A New Approach to Linear Filtering and Prediction Problem", Transactions of the ASME, Series D, Journal of Basic Engineering, vol. 82, pp. 35-45, 1960.
Mar. 4, 2010 Examiner's First Report in Australian Patent Appln. No. 2007254600.

* cited by examiner

*Primary Examiner* — Anand Bhatnagar
(74) *Attorney, Agent, or Firm* — Fitzpatrick, Cella, Harper & Scinto

(57) ABSTRACT

Disclosed is a system (200) and method (101) for collaborative tracking of an object, the method comprising updating (105) the track with an object measurement using a camera tracking module (230), determining (110) a track quality measure for the updated track, based on the track quality measure, determining (120) whether a second tracking module (260), remotely located from the camera, should be applied, if the second tracking module (260) is to be applied, selecting (130) data describing the track and the object, transmitting (140) the selected data to the second tracking module over a network (240) that imposes constraints of bandwidth and/or latency, and applying (150) the second tracking module (260) to determine the next position of the object in the track.

10 Claims, 4 Drawing Sheets

COLLABORATIVE TRACKING

CROSS-REFERENCE TO RELATED PATENT APPLICATIONS

This application claims the right of priority under 35 U.S.C. §119 based on Australian Patent Application No. 2007254600, filed 20 Dec. 2007, which is incorporated by reference herein in its entirety as if fully set forth herein.

FIELD OF THE INVENTION

The current invention relates to video processing and in particular to object tracking.

BACKGROUND

Tracking of objects in video streams is an important feature of intelligent video analysis systems. Conventional systems first detect objects in frames of a video, and then relate objects in different frames to one another. The relating of objects is called tracking. One example of object tracking is the situation in which a system identifies people crossing the field of view of a video camera, and determines the tracks of these people in order to count how many people cross the noted field of view in a defined time period.

Typically, tracking methods predict a position of the object to be tracked in a frame at a time t based on a history of known positions of the object and previous predictions of the position of the object before the time t.

There are various types of tracking, including point-based tracking in which an object is represented by one or more points, and kernel based tracking in which an object is represented by a template.

Several factors impact on the quality of tracking:
Input quality (object detection results). If objects are not detected correctly, this affects the feature values on which tracking is based, e.g., the centre of gravity. This is especially troublesome if the detection error is not consistent over succeeding frames.
Content complexity. This includes full/partial occlusion or change in appearance of the tracked object, a change in direction or velocity, a change in the depth, and so on.
Object interaction. Objects may merge (e.g., somebody picking up a suitcase) or split (e.g., somebody stepping out of a car).
Availability of computational resources.

A large number of tracking methods have been proposed. Computationally inexpensive methods can be incorporated as part of a camera. However, the functionality of such methods is restricted to simple situations (e.g., one person walking slowly in the field of view) and is typically not able to cope with more complex situations that occur in practice (e.g. several people passing and occluding one another).

Tracking methods that are relatively robust to input quality, content complexity and object interaction require computational resources that are not practical to embed in devices such as cameras. Therefore, processing usually takes place on a separate computer system, such as a Personal Computer (PC). Such a setup puts additional constraints on a tracking system. For example, considerable bandwidth is generally needed to transmit the video stream to the separate computer system.

SUMMARY

It is an object of the present invention to substantially overcome, or at least ameliorate, one or more disadvantages of existing arrangements.

Disclosed are arrangements, referred to as Collaborative Tracking (CTR) arrangements, which seek to address the above problems by transferring processing between a camera and a remote computing device (such as a Personal Computer also referred to as a PC) over a network. The CTR approach performs as much processing on a camera as possible (using a "simple" tracker), and transfers processing to the remote computer system (which uses "advanced/complex" tracking) when necessary. The CTR approach determines (a) when it is necessary to transfer control, e.g., when the simple tracker loses confidence in its predictions, or when it encounters a complex situation (e.g., multiple objects coming close to one another), and (b) what information is to be sent from the camera to the remote PC.

According to a first aspect of the present invention, there is provided a method of predicting the next position of an object in a track, said method comprising the steps of:
 (a) determining an object track comprising at least a history of object positions;
 (b) determining, using a processing module on an image capture device, (i) a first prediction for a next position for said object track, based on said history of object positions, and (ii) a confidence score for said prediction; and
 (c) based on said confidence score transmitting, over a network, at least said object track to a second processing module on a device remote from said image capture device.

According to another aspect of the present invention, there is provided a method of determining the next position of an object in a track, said method comprising the steps of:
 (a) updating a track using a first tracking module;
 (b) determining a track quality measure for said updated track;
 (c) based on said track quality measure, determining whether a second tracking module, remotely located from the first tracking module, should be applied;
 (d) if said second tracking module is to be applied:
  (i) selecting data describing said track and said object;
  (ii) transmitting said selected data to said second tracking module over a network; and
  (iii) applying said second tracking module to determine the next position of said object in said track.

According to another aspect of the present invention, there is provided a method, in a system comprising an image capture device and a remote device able to communicate with the image capture device over a network, for allocating object tracking resources on the remote device, the method comprising the steps of:
 (a) receiving from a tracking module in the image capture device a track quality measure value and data describing the corresponding track and corresponding object; and
 (b) based on the track quality measure, allocating an object tracking resource on said remote device to determine the track of the object using said track and object data.

According to another aspect of the present invention, there is provided a system for determining the next position of an object in a track, said system comprising:
 a plurality of memory modules for storing a corresponding plurality of program modules; and
 a plurality of processors for executing the program modules, wherein the plurality of memory modules and the associated plurality of processors can communicate over a network, said program comprising:
 (a) code for updating a track with an object measurement using a first tracking module;
 (b) code for determining a track quality measure for said updated track;

(c) code for, based on said track quality measure, determining whether a second tracking module, remotely located from the first tracking module, should be applied;
    (d) code for, if said second tracking module is to be applied:
        (i) selecting data describing said track and said object;
        (ii) transmitting said selected data to said second tracking module over a network; and
        (iii) code for applying said second tracking module to determine the next position of said object in said track.

According to another aspect of the present invention, there is provided a computer program product including a computer readable medium having recorded thereon a computer program for directing a processor to execute a method for determining the next position of an object in a track, said program comprising:
    (a) code for updating a track with an object measurement using a first tracking module;
    (b) code for determining a track quality measure for said updated track;
    (c) code for, based on said track quality measure, determining whether a second tracking module, remotely located from the first tracking module, should be applied;
    (d) code for, if said second tracking module is to be applied:
        (i) selecting data describing said track and said object;
        (ii) transmitting said selected data to said second tracking module over a network; and
        (iii) code for applying said second tracking module to determine the next position of said object in said track.

Other aspects of the invention are also disclosed.

BRIEF DESCRIPTION OF THE DRAWINGS

One or more embodiments of the invention will now be described with reference to the drawings, in which.

DESCRIPTION INCLUDING BEST MODE

Figure 1:
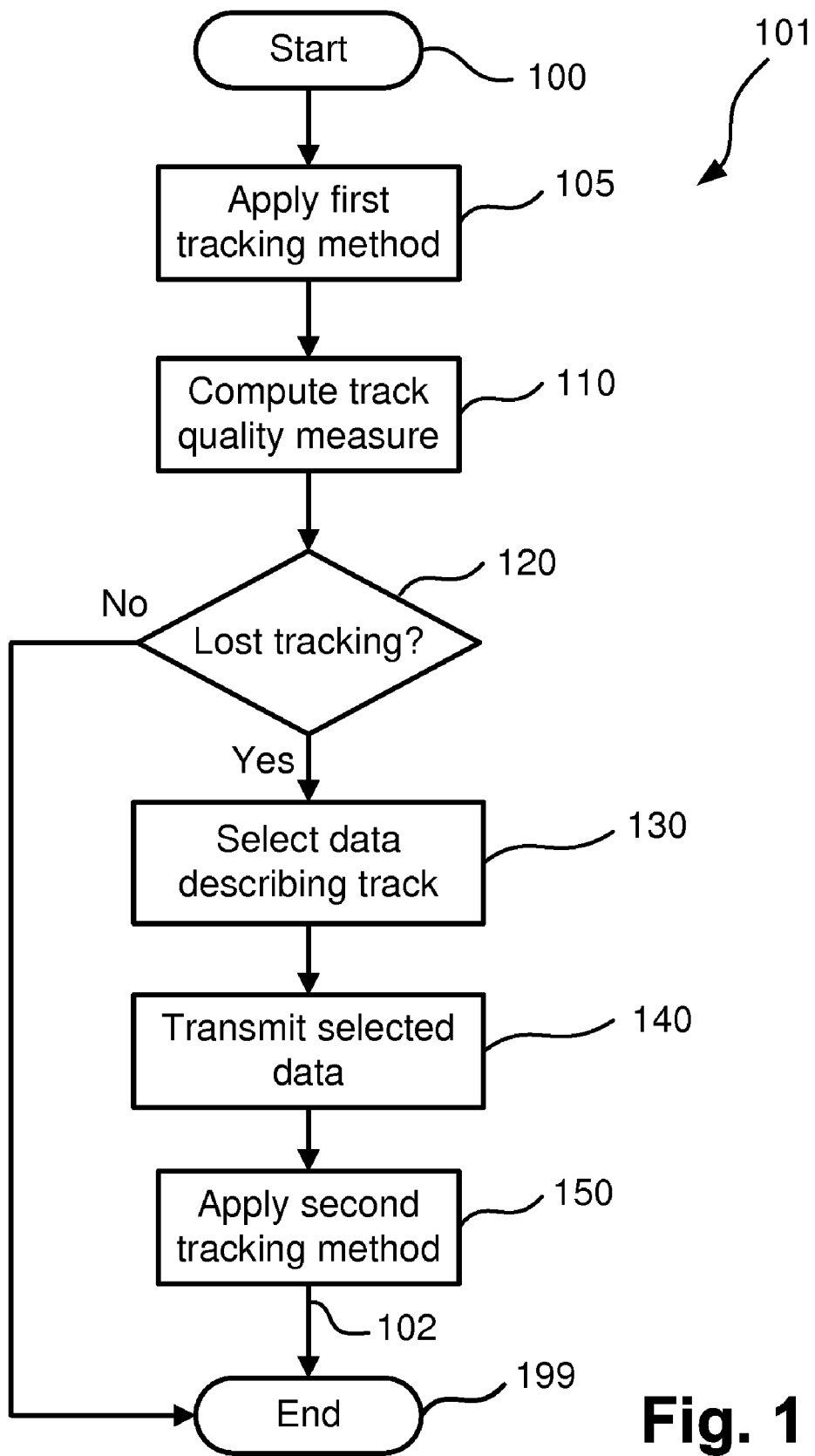
FIG. 1 is a flow diagram illustrating a method of collaborative object tracking according to one CTR arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which may form public knowledge through their use. Such discussions should not be interpreted as a representation by the present inventor(s) or patent applicant that such devices in any way form part of the common general knowledge in the art.

A tracking system is disclosed in which an embedded on-camera tracking system collaborates with a remote tracking system that performs higher quality tracking.

Figure 2:
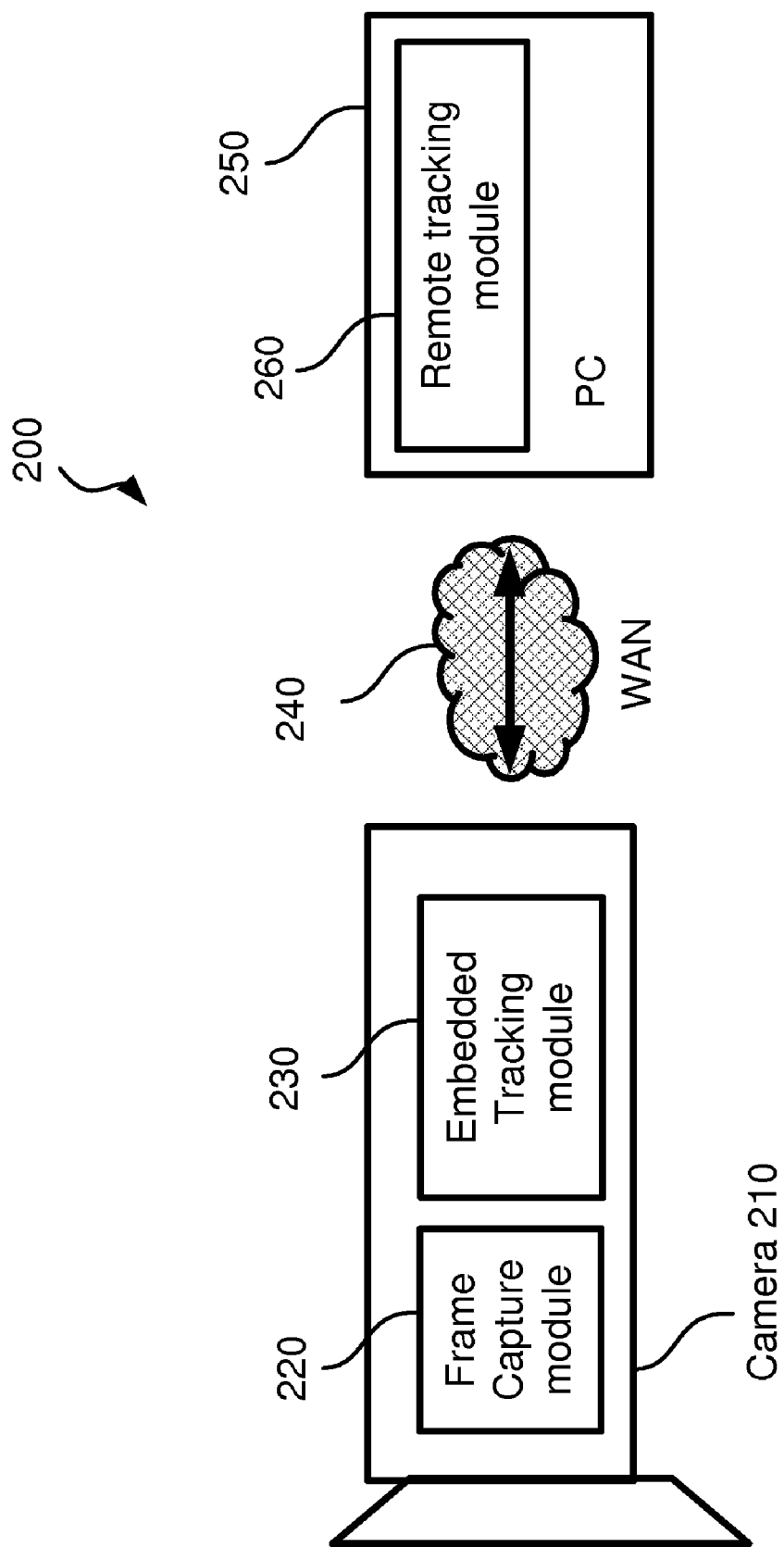
FIG. 2 is a functional block diagram of a single-camera CTR system architecture.

FIG. 2 depicts a single camera CTR system architecture 200. The embedded (ie on-camera) camera tracking module 230 runs on the video camera (also referred to generically as an image capture device) 210 which has an image capture module 220. The camera 210 may be a fixed position camera, e.g., attached to a wall, or alternately may be used with a tripod. The camera 210 may be a fixed view camera or a pan-tilt-zoom camera, or alternately may be a hand-held camera.

The remote tracking module 260 runs on a Personal Computer (PC) device 250, which is connected in a wireless or wired fashion (e.g., through a wide area network (WAN) 240), to the image capture device 210. The remote tracking module 260 may alternately run on a set-top box (not shown) that is connected to the camera 210 with cables. The aforementioned set-top box and the camera 210 may form part of a larger system such as a video conference system.

The remote PC device 250 is physically remotely located and separated from the image capture device 210, and provides computation power which cannot practically be embedded in the image capture device 210. The network 240, which can be regarded as a network that is limited in regard to bandwidth and/or latency, over which the camera 210 and the remote PC 250 communicate, typically imposes significant constraints on available bandwidth and latency.

The remote PC 250 can service a number of image capture devices. The remote PC 250 may thus collaborate with a large number of image capture devices 210 simultaneously, or alternately, may alternate its resource usage among a large number of image capture devices 210. However, the remote PC 250 may be constrained in available resources, such as processing power and memory, as well as in the number of connections to cameras it can accept simultaneously. Furthermore, the remote PC 250 can provide additional functionality which may be unrelated to the tracking functionality of the tracking module 260, such as inserting event information into a database (not shown), or recording a data stream.

One advantage of the CTR approach is to increase the autonomy of the embedded tracking module 230 for non-complex cases, which can be expected to constitute the majority of applications. Thus, for example, the tracking module 230 may be embedded in a pan-tilt-zoom camera that can adjust its field of view based on the tracking information provided by the tracking module 230, without interaction with an operator or a physically separated machine such as the PC 250 that is accessible via the network 240. On a hand-held camera, the camera may adjust focus to the tracked object. In other words, since the CTR approach provides a high degree of confidence that high-complexity situations, when they occur, can be adequately dealt with by the remote PC, the system user can have confidence that the (normal) low-complexity cases can be dealt with autonomously by the on-camera tracking module.

Another advantage of the CTR approach is to provide more robust and accurate tracking results in many cases. The remote tracking module 260 is used when it is necessary. For example, when it is not possible for the camera tracking module 230 on the camera 210 to provide robust tracking results, autonomy is traded off against accuracy and robustness, and the remote tracking module 260 is activated over the network 240.

Yet another advantage of the CTR approach is to save bandwidth so that a large number of image capture devices 210 can collaborate with a small number of external devices 250.

An object track is a history of the object position, typically being a sequence of estimates based on measurements associated with that object. For example, the estimates may be position and velocity of the tracked object, and the measurements may be x- and y-positions of centroids of objects detected in frames.

In one arrangement tracking takes measurements of an object location as an input, and generates predictions about the next expected object location as an output. Predictions and actual measurements are then matched through data association. If a measurement can't be matched to a prediction of an existing track, a new track is created or the measurement is considered to be noise. The match between a prediction and a corresponding measurement is indicative of a Track Quality Measure (TQM) that is described in more detail below.

This description relates to measurements that result from object detection in a video frame. For example, a background model can be created that models a scene over time such that the non-transitional aspects of the scene are modelled. A newly captured frame is then compared to the background model and the differences are assumed to be caused by the appearance of foreground objects. When foreground is found in a frame, it can be aggregated into blobs (connected components) and objects. An object may consist of several disjoint blobs. Post-processing can be done, e.g., to remove small objects that are likely to constitute noise. Information about detected objects is given to the tracking module (such as 230 in FIG. 2). The object information may be a mask or even the original pixel data, but often it is more abstract information such as the bounding box coordinates or the position of the centroid of the object in question.

In a simple example of tracking, objects are known to move according to a motion model that is defined by a known constant velocity. Given initial positions at a time t, the positions of the objects at a future time t+1, etc., can be accurately predicted. However in practice, even for this simple example there are complications. For example, there is sensor noise such that the measurements of the object may be inaccurate, even though the object may be moving as expected according to the motion model. For example, if object detection misses the legs or head of a person, a measurement may not consistently reflect the actual position of the person.

In addition, in practice the motion model is just a close approximation of actual motion. For example, if people are walking at a constant velocity on average, at different points in time they may have different instantaneous velocities. Consequently individual measurements will typically deviate from predictions. In other words, there is process noise in the modelling process.

In more complex examples, objects may be occluded (e.g., by walking behind a pillar), and/or objects may change speed and direction at any time, and/or objects may stop moving for a while. Furthermore, objects may cross-over (i.e., intersect their paths), and/or objects may split (e.g., leaving behind a suitcase), and/or objects may merge (e.g., picking up a suitcase), etc.

Tracking methods can be classified as point-based, feature-based or template-based. Point-based tracking can be done relatively efficiently, because there is little information to process in this case. However, this approach cannot handle complex scenarios, and depends heavily on the motion model being correct. Feature-based and template-based tracking are less efficient, depending on the types of features and templates used, but are more robust against occlusions, cross-overs and motion changes.

It is desirable to embed the tracking module 230 on the camera 210. The camera 210 may be able to operate autonomously (e.g., pan or zoom) and/or may reduce bandwidth required and reduce the number of connections required by summarising tracking information before sending the information over the network 240 to clients such as the PC 250.

In the CTR approach, a collaborative system combines the economic advantages of simple tracking methods that can be incorporated into cameras such as 210 and the robustness of complex tracking methods that can be implements on remote PCs such as 250 by switching tracking from the simple on-camera module 230 to the complex module 260 executed on the PC device 250.

FIG. 1 is a flow diagram illustrating a process 101 of collaborative object tracking according to one CTR arrangement. The process 101 starts at step 100 by the camera tracking module 230 employing a first, simple and computationally inexpensive, tracking method in a step 105. In this description the terms "tracking method" and "tracking module" are used interchangeably unless indicated otherwise by the context in which the term is used. After each update of the track, a track quality measure TQM is computed by the camera tracking module 230 in a step 110, the quality measure indicating a confidence score for the accuracy of the updated track. Based on the track quality measure determined in the step 110, a lost tracking decision is made by the camera tracking module 230 in a step 120. In one example, the TQM determination step 110 determines the difference between a predicted object track position and the corresponding measured object track position.

If the decision in the step 120 is that tracking has not been lost (i.e., the confidence score associated with the track quality measure exceeds a predetermined threshold and thus supports the decision that tracking has not been lost), the first tracking method performed by the camera tracking module 230 proceeds as usual, that is the first tracking method performed by the camera tracking module 230 will be applied to the measurement at the next point in time. As FIG. 1 depicts only one iteration of the aforementioned process, the process 101 ends at a step 199. In practice however, the process 101 typically iterates repeatedly.

If the decision performed by the camera tracking module 230 at the step 120 is that tracking is lost (i.e., the confidence score associated with the track quality measure does not meet the predetermined threshold and thus supports the decision that tracking has been lost), information about the tracked object is selected by the camera tracking module 230 at a step 130. The selected information is transmitted by the camera tracking module 230 in a step 140, from the camera tracking module 230 over the wide area network 240, the modem 416, and the I/O interface 408 and the bus system 404, to the processor 405 which executes the second, complex and computationally expensive tracking module software application 260, in a step 150. The second tracking module 260 in the remote PC 250 then proceeds with the tracking in a step 150. As FIG. 1 depicts one iteration of the process 101 only, the process then ends with the step 199. In practice however, the process 101 typically iterates repeatedly, under the collaborative control of (a) the processor 405 executing the tracking module software application 260 in the remote PC 250, and (b) the processor (not shown) in the camera 210 executing the tracking module software application 230 in the camera 210.

The first tracking method step 105, track quality measurement step 110 and lost tracking decision step 120, information selection step 130 and information transmission step 140 are performed by the embedded camera tracking module 230. The second tracking method step 150 is performed by the remote PC tracking module 260.

The individual steps and components of the method 101 are described in more detail below.

While the second tracking method step 150 is running, the first tracking method step 105 can still run in parallel on subsequently captured frames. The first tracking method step 105 can pick up a track again, e.g., after occlusion, if the quality measure value increases. Alternately the first tracking method step 105 can be reinitialized based on feedback from the second tracking method step 150, which helps in situations that are not easy to track and then hands over to first tracking method again.

The First, Simple, Tracking Method Step 105

In one arrangement, the simple tracking method used in the step 105 is based upon a Kalman Filter using nearest neighbour data association. The Kalman Filter is well known to those skilled in the art (Kalman, R. E. "A New Approach to Linear Filtering and Prediction Problems," *Transactions of the ASME—Journal of Basic Engineering* Vol. 82: pp. 35-45, 1960). It is a recursive filter that uses a filter state estimation from a previous step and the measurement of the current step to estimate the state in the current step. During each step of the Kalman Filter, a prediction for the new step is made based on the old step's state. The step 105 thus generates a track prediction.

The Track Quality Measure Step 110

Let p be the prediction for a track. Let z be either a measurement associated with a track, or be defined as "no match" if no measurement was associated with a track at that point in time, e.g., because the object was occluded.

In one arrangement, the value of a binary track quality measure determined in the step 110 is set to $TQM_{Binary}=1$ if z had a value other than "no match", and the quality is set to $TQM_{Binary}=0$ if z had the value "no match".

In another arrangement, the difference between measurement z and prediction p is used to measure the quality of the track. For each dimension, say x-position and y-position, a normalised difference value between measurement z and prediction p is computed as follows:

$$diff_x = \frac{(z_x - p_x)^2}{var x} \text{ and} \quad [1]$$

$$diff_y = \frac{(z_y - p_y)^2}{var y} \quad [2]$$

where: $diff_x$ is the normalised difference value in the x direction, $z_x$ is the measured x position, $p_x$ is the predicted x position, var x is the variance of the x position, $diff_y$ is the normalised difference value in the y direction, $z_y$ is the measured y position, $p_y$ is the predicted y position, var y is the variance of the y position. The variance corresponds to the usual variation in the value of x and y. By normalising over the variance, it is easier to tell whether a found difference is significant. Variance may be a precomputed value, e.g. computed over found positions in a training set, or previous runs of the algorithm, or it may be computed dynamically over previous positions in the track.

The track quality measure TQM is set to the following value:

$$TQM_{NormMax} \max\left(\frac{1}{diff_x}, \frac{1}{diff_y}\right) \quad [3]$$

where: the max operator returns the larger of the two values within the parentheses.

Alternatively, the track quality measure TQM is set to the following value:

$$TQM_{NormAdd} \frac{1}{diff_x} + \frac{1}{diff_y}. \quad [4]$$

In another arrangement, the track quality measure depends on the complexity of the data. That is, if several measurements are in close proximity to one another, it is harder to disambiguate them for data association. In this case, the track quality measure is 1 minus the distance of the prediction to the nearest neighbour measurement divided by the distance of the prediction to the second nearest neighbour measurement. This is expressed mathematically as follows:

$$d(p, z^n) = \sqrt{(p_x - z_x^n)^2 + (p_y - z_y^n)^2}$$

$$TQM_{NN} = \begin{cases} 0, & \text{if } d(p, z^2) \text{ equals } 0 \\ 1 - \frac{d(p, z^1)}{d(p, z^2)}, & \text{otherwise,} \end{cases}$$

where d is the distance between prediction p and measurement $z^n$, and $z^n$ is the n-th measurement (starting with n=1 as the first) in a set of all measurements ordered according to their distance d to prediction p.

If there is a high probability of confusing measurements, the track quality measure is close to 0. The track quality measurement step 110 thus determines the TQM as a function of the match between the predicted and measured track.

The Lost Tracking Decision Step 120

In one arrangement, the track quality measure is compared with a predefined threshold. If the quality measure value differs from the threshold (i.e., is less than the threshold in the present example) where the threshold is say 0.5 for a $TQM_{binary}$, 0.25 for $TQM_{NormMax}$, or 0.65 for $TQM_{NN}$, the simple tracking method is said to have lost track. A lost tracking decision results in the activation of the complex tracking method.

The Selecting Information Step 130

When the lost tracking decision step 120 indicates that the simple tracking method (performed by the camera tracking module 230) does not perform well enough, information about the track is selected and transmitted to the complex tracking method (performed by the remote PC based tracking module 260). Below, further details of the selection criteria are given, as well as an explanation of how the relevant data are created or collected prior to the lost tracking decision being made.

In one arrangement, whole or partial frames of the image data being captured by the frame capture module 220 are sent to the remote PC 250 on a regular basis but at a relatively low frame rate to avoid waste of bandwidth and the remote PC's resources. In one arrangement, the partial frame may is a predetermined region in the frame, for example set by a user. In another arrangement, the partial frame is the result of an object detection method. This sending of information is performed independently of the tracking method, i.e., irrespective of the determination made by the lost tracking step 120. When the step 120 determines that tracking has been lost, the tracking information, including information about the object measurements such as position and dimension, since the last time a frame was sent is then selected for transmission by the step 130.

In another arrangement, a signature of the tracked object, say a colour histogram, is created and updated frequently, say every frame or every 5 frames, this signature being stored on-board the camera 210. When the step 120 determines that tracking has been lost, the signature is then selected for transmission by the step 130. (Signatures are described in more detail in a later section.)

In another arrangement, an additional quality decision is made after each track update, this additional quality decision using higher thresholds, say 2.5 for the normalised difference quality measure. The result of this decision relates not to whether the track has been lost, but whether there is a potential to lose track. If it is determined that there is a significant potential to lose track, then a signature of the tracked object is created or updated, say a colour histogram. This signature is then selected for transmission by the step 130.

In another arrangement, the camera maintains a cache of frames or part frames, and image information is selected from the cache. Selection depends on available bandwidth over the network 240. If high bandwidth is available, all frames recorded since the start of the track are selected by the step 130. If bandwidth availability is low, the first cached frame captured since the creation of the track is selected by the step 130.

Alternatively, the $TQM_{NormMax}$ measure is used to select a frame by finding the point in the track where the $TQM_{NormMax}$ was lowest. The frame captured closest to this point (in time) and that was captured since the creation of the track, is selected by the step 130. The selected frames or part frames are then transmitted by the step 140. Alternatively, signatures of part frames, corresponding to object measurements, are computed and transmitted.

The Second, Complex Tracking Method Step 150

The remote processing module 260 receives information from the embedded module 230 if so decided by the step 120 in FIG. 1. The remote module 260 then begins a complex tracking method based on the received information.

In one arrangement, the signature of the target object, received from the camera tracking module in the step 140 in FIG. 1, is compared to signatures computed by the remote tracking module 260 at all pixel locations in a captured frame which has been sent from the camera 210 over the network 240 to the remote PC 250. For each pixel location in the captured frame, a signature is computed based on the shape or dimensions of the target object using the image information of the captured frame. (More details on signature comparison are described in a later section.) The aforementioned signature comparison is thus used by the remote tracking module 260 to predict the next position of an object in the track.

In another arrangement, for each pixel location in the captured frame a signature is computed by applying the mask of the target object, received from the camera tracking module in the step 140 in FIG. 1, to the image, where the centre of the mask is placed at the pixel location in question. The pixel location that has the signature with the highest similarity to the target signature is a match to the track. A threshold may be applied to ensure that the similarity is sufficient, as the object may have left the field of view, or it may have been occluded. The same target mask and computed signature, as supplied by the first tracking method (i.e., 105 in FIG. 1), may be used to find a corresponding object in subsequent captured frames. Alternatively, the target mask may be updated according to objects found by the second tracking method (i.e., 150 in FIG. 1).

In another arrangement, instead of a signature match for each pixel location, only those pixel locations that are part of a detected object are used as candidates.

In yet another arrangement, the candidate pixel locations are sampled with a bias towards the previous location of the target object. For example, the samples are drawn according to a distribution, say a 2D Gaussian distribution, around the last measured position of the object.

Signature

A signature is a representation of the visual characteristics of an object. In one arrangement, the signature is the normalised RGB histogram of the pixels in a detected object. The values are discretised into a number bins for each of the three dimensions, say 8, resulting in an 8×8×8 3D histogram.

In another arrangement, the signature is the average intensity of the pixels in a detected object.

In yet another arrangement, the signature is based on the information in transform coefficients, such as DCT or wavelet, for blocks corresponding to a detected object. For example, 64 DCT coefficients for the Y-component (of YUV colour space) for an 8×8 block of pixels are used as a signature.

In yet another arrangement, the signature consists of the pixel values of the object, i.e., it is a template.

Signature Comparison

Two signatures may be compared to compute a similarity score.

In one arrangement, two normalised RGB histograms, p and q, are compared by using the Bhattacharyya coefficient as follows:

$$sim(p, q) = \sum_{b=1...B} \sqrt{p(b)q(b)} \quad [5]$$

where: the sim operator defines the similarity between histograms p and q, b is a the b-th bin in the histogram and the histogram contains B bins. When the relationship in [5] returns a value of 1, the two signatures are identical.

In another arrangement, the signature is a singular value, e.g., average intensity, and the similarity can be computed by taking the absolute value of the subtraction divided by the maximum range value minus the minimum range value for the signature.

In another arrangement, signatures $F^p$ and $F^q$ of 64 DCT coefficients are compared by summing the squares of the differences between each coefficient, and normalising the result. Thus for example let F be the signature where $F_1$ to $F_{64}$ are the coefficients, where each coefficient is in the range 0.255. The similarity score is then computed as follows:

$$sim(F^p, F^q) = 1 - \frac{\sum_{c=1...64}(F_c^p - F_c^q)^2}{64 \cdot 255^2} \quad [6]$$

In another arrangement, template signatures $T^p$ and $T^q$ are compared by summing the absolute values of the differences of the pixels. Let pixel values be in the range from 0.255 as follows:

$$sim(T^p, T^q) = 1 - \frac{\sum_{y=1...height}\sum_{x=1...width}|T^p(x, y) - T^q(x, y)|}{width \cdot height \cdot 255} \quad [7]$$

Extensions to the CTR Approach

Figure 3:
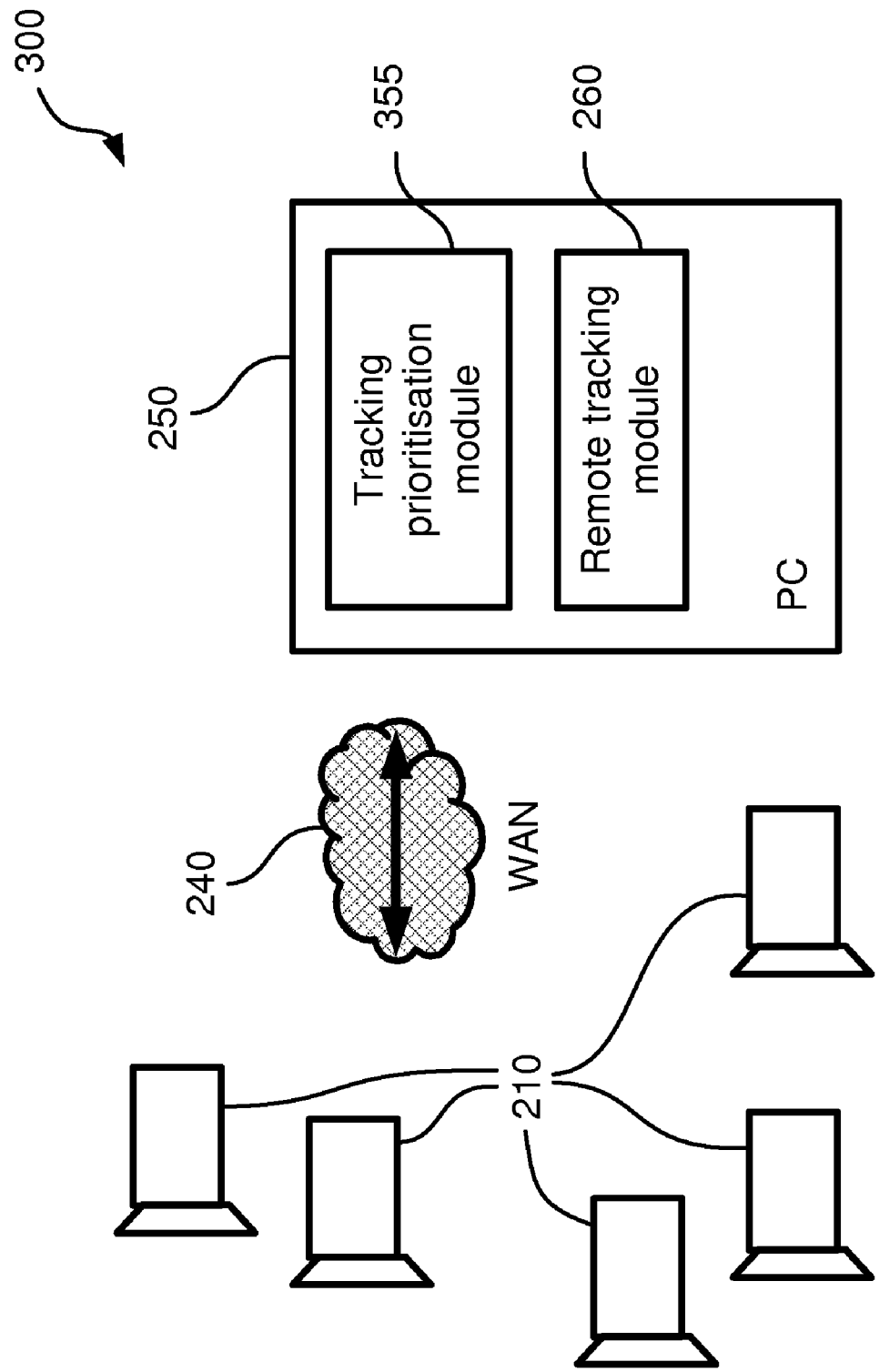
FIG. 3 is a functional block diagram of a multiple-camera CTR system architecture.

FIG. 3 depicts a multiple camera CTR system architecture 300 in which multiple cameras 210 connect to the one remote device 250 through the network 240. Although such a remote device 250 is expected to be less constrained computationally than the on-camera computation modules (such as 230 in FIG. 2) in the cameras 210, the remote device 250 has a tracking prioritization module 355 that decides which embedded devices 210 are to be assisted in what order by the remote object tracking module 260.

One arrangement of a tracking prioritization method used by the prioritization module 355 uses a time based approach. For example, a first in first out method may be implemented.

However, some cameras 210 may be more in need of help than other cameras 210. Therefore, another arrangement uses prioritization based on the tracking quality. The computed tracking quality measure determined in the step 110 (see FIG. 1) is transmitted with other selected information about the tracked object in the step 140. The tracking prioritization module 355 then allocates access to the remote tracking module 260 to the devices 210 that show the lowest (i.e., worst) tracking quality measure values. To free resources, if required, the tracking prioritization module 355 does not provide access to the remote tracking module 260 for the cameras 210 with the highest tracking quality measure values. The tracking prioritization module also typically can de-allocate access to the remote tracking module 260 to devices whose quality measure values exceed a quality measure threshold.

Figure 4:
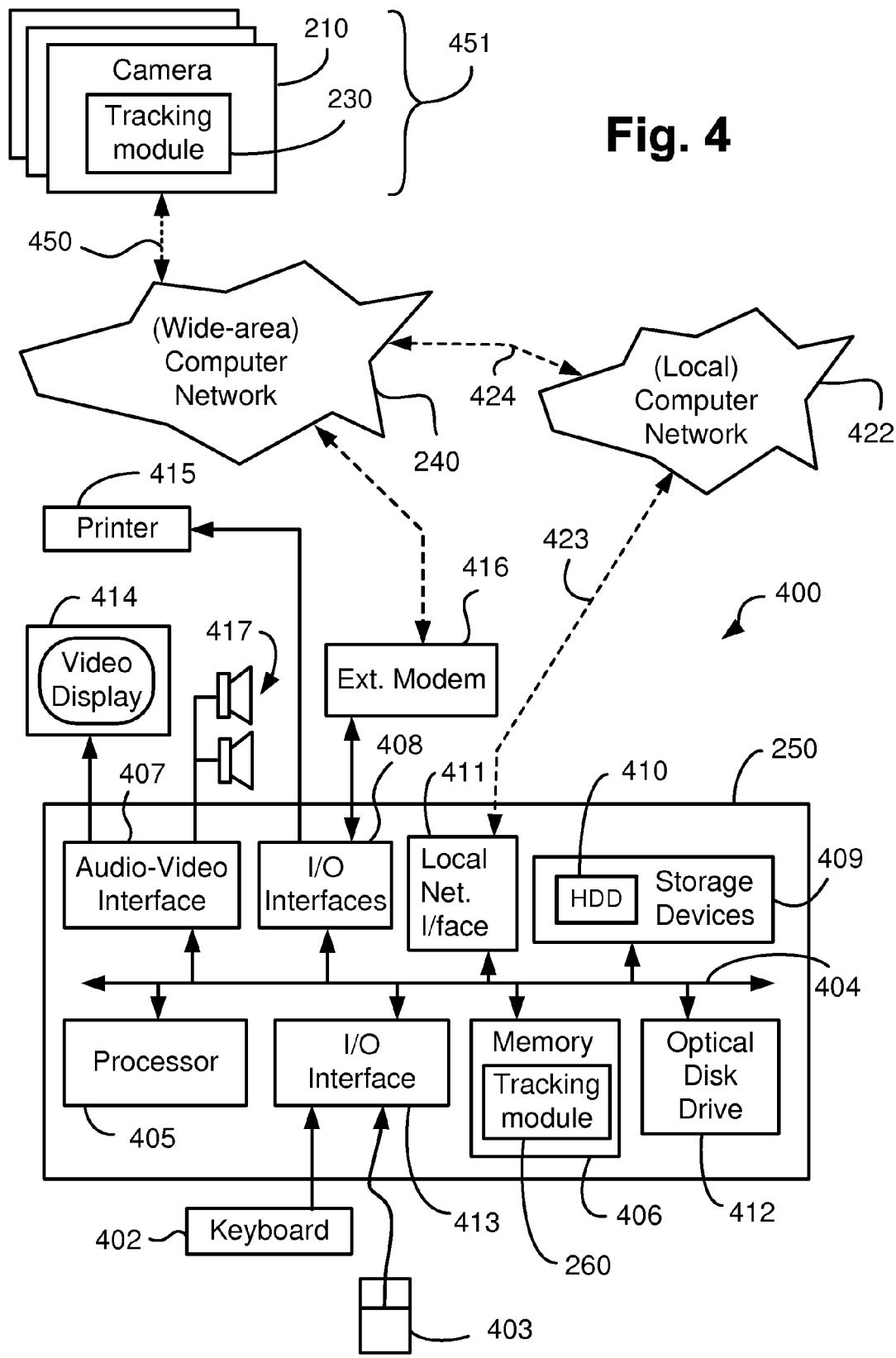
FIG. 4 is a schematic block diagram of the arrangement in FIG. 2.

FIG. 4 is a schematic block diagram of a system 400 for practicing the arrangement in FIG. 2. The CTR approach may be implemented using the computer system 400 in FIG. 4 wherein the process of FIG. 1 may be implemented as one or more software modules, such as one or more CTR application programs 230, 260 executable within the computer system 400. In particular, the CTR method steps are effected by instructions in the CTR software 230, 260 that are carried out within the computer system 400. The instructions may be formed as one or more code modules, each for performing one or more particular tasks. The software may also be divided into two separate parts, in which a first part and the corresponding code modules performs the CTR methods and a second part and the corresponding code modules manage a user interface between the first part and the user. The CTR software may be stored in a computer readable medium, including the storage devices described below, for example. The software is loaded into the computer system 400 from the computer readable medium, and then executed by the computer system 400. A computer readable medium having such software or computer program recorded on it is a computer program product. The use of the computer program product in the computer system 400 preferably effects an advantageous apparatus for practicing the CTR approach.

As seen in FIG. 4, the computer system 400 is formed by the computer module 250, input devices such as the camera 210, which may be a member of a group 451 of cameras, a keyboard 402 and a mouse pointer device 403, and output devices including a printer 415, a display device 414 and loudspeakers 417. An external Modulator-Demodulator (Modem) transceiver device 416 may be used by the computer module 250 for communicating to and from the cameras 451 over the communications network 240 via a connection 421. The network 240 may be a wide-area network (WAN), such as the Internet or a private WAN. Where the connection 421 is a telephone line, the modem 416 may be a traditional "dial-up" modem. Alternatively, where the connection 421 is a high capacity (e.g.: cable) connection, the modem 416 may be a broadband modem. A wireless modem may also be used for wireless connection to the network 240.

The computer module 250 typically includes at least one processor unit 405, and a memory unit 406 for example formed from semiconductor random access memory (RAM) and read only memory (ROM). The module 250 also includes an number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the external modem 416 and printer 415. In some implementations, the modem 416 may be incorporated within the computer module 401, for example within the interface 408.

The computer module 250 also has a local network interface 411 which, via a connection 423, permits coupling of the computer system 400 to a local computer network 422, known as a Local Area Network (LAN). As also illustrated, the local network 422 may also couple to the wide network 240 via a connection 424, which would typically include a so-called "firewall" device or similar functionality. The interface 411 may be formed by an Ethernet™ circuit card, a wireless Bluetooth™ or an IEEE 802.11 wireless arrangement.

The interfaces 408 and 413 may afford both serial and parallel connectivity, the former typically being implemented according to the Universal Serial Bus (USB) standards and having corresponding USB connectors (not illustrated). Storage devices 409 are provided and typically include a hard disk drive (HDD) 410. Other devices such as a floppy disk drive and a magnetic tape drive (not illustrated) may also be used. An optical disk drive 412 is typically provided to act as a non-volatile source of data. Portable memory devices, such optical disks (e.g.: CD-ROM, DVD), USB-RAM, and floppy disks for example may then be used as appropriate sources of data to the system 400.

The components 405, to 413 of the computer module 250 typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations, Apple Mac™ or alike computer systems evolved therefrom.

Typically, the CTR application programs 230, 260 discussed above are resident on the hard disk drive 410 and read and controlled in execution by the processor 405. Intermediate storage of such programs and any data fetched from the networks 420 and 422 may be accomplished using the semiconductor memory 406, possibly in concert with the hard disk drive 410. In some instances, the CTR application programs 230, 260 may be supplied to the user encoded on one or more CD-ROM (not shown) and read via the corresponding drive 412, or alternatively may be read by the user from the networks 420 or 422. Still further, the CTR software can also be loaded into the computer system 400 from other computer readable media. Computer readable media refers to any storage or transmission medium that participates in providing instructions and/or data to the computer system 400 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the CTR application programs 230, 260 and the corresponding code modules mentioned above may be executed to implement one or more graphical user interfaces (GUIs) to be rendered or otherwise represented upon the display 414. Through manipulation of the keyboard 402 and the mouse 403, a user of the computer system 400 and the CTR application may manipulate the interface to provide controlling commands and/or input to the applications associated with the GUI(s).

The CTR approach may alternatively be implemented in dedicated hardware such as one or more integrated circuits performing the CTR functions or sub functions. Such dedicated hardware may include graphic processors, digital signal processors, or one or more microprocessors and associated memories.

Control Back to Simple Tracking Method

In one arrangement, the second, complex tracking method is running on the remote tracking module 260, while the first, simple tracking method is running on the embedded tracking module 230. The embedded tracking module 230 keeps computing the Track Quality Measure (TQM). When the value of the TQM is not less than the threshold in step 120, the embedded tracking module 230 is capable of robust tracking again. The embedded tracking module 230 sends a deactivation message to the remote tracking module 260. The remote tracking module 260 then stops processing, and the PC 250 changes the rate of received frames from camera 210 to a lower frame rate, or stops receiving frames altogether.

In another arrangement, the PC 250 runs a simple tracking method in parallel to the complex tracking method in order to compute the TQM. When the value of the TQM is not less than the threshold in step 120, the remote tracking module 260 on the PC 250 gives control back to the embedded tracking module 230 on the camera 210. In one arrangement, the remote tracking module sends information about the state of the simple tracking method (as run on PC 250) to the embedded tracking module 230. The embedded tracking module 230 then initialises the simple tracking method with the state information. An example of state information for a Kalman Filter simple tracking method is the predicted state and the error covariance matrix.

Industrial Applicability

It is apparent from the above that the CTR arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method of predicting the next position of an object in a track, said method comprising the steps of:
    (a) determining an object track comprising at least a history of object position;
    (b) determining, using a processing module on an image capture device, (i) a first prediction for a next position for the object track, based on the history of object positions, and (ii) a confidence score for the prediction; and
    (c) based on the confidence score transmitting, over a network, at least the object track to a second processing module on a device remote from the image capture device.

2. A method according to claim 1, wherein the network imposes constraints of at least one of bandwidth and latency.

3. A method of determining the next position of an object in a track, said method comprising the steps of:
    (a) updating a track using a first tracking module;
    (b) determining a track quality measure for the updated track;
    (c) based on the track quality measure, determining whether a second tracking module, remotely located from the first tracking module, should be applied;
    (d) if the second tracking module is to be applied:
        (i) selecting data describing the track and the object;
        (ii) transmitting the selected data to the second tracking module over a network; and
        (iii) applying the second tracking module to determine the next position of the object in the track.

4. A method according to claim 3, comprising the further steps of:
    (a) transmitting the next position to the first tracking module; and
    (b) updating the track maintained by the first tracking module with the position determined by the second tracking module.

5. A method according to claim 3, where the track quality measure is determined based on the difference between measurements and predictions.

6. A method according to claim 3, comprising the further step of:
    based on the track quality measure, determining whether a signature of the tracked object should be stored.

7. A method, in a system comprising an image capture device and a remote device able to communicate with the image capture device over a network, for allocating object tracking resources on the remote device, said method comprising the steps of:
    (a) receiving, from a tracking module in the image capture device, a track quality measure value and data describing the corresponding track and corresponding object; and
    (b) based on the track quality measure, allocating an object tracking resource on the remote device to determine the track of the object using the track and object data.

8. A method according to claim 7, comprising the further step of:
    deallocating the object tracking resource used for an object track with a higher track quality measure value.

9. A system for determining the next position of an object in a track, said system comprising:
    a plurality of memory modules for storing a corresponding plurality of program modules; and
    a plurality of processors for executing the program modules, wherein the plurality of memory modules and the associated plurality of processors can communicate over a network, the program modules comprising:
    (a) code for updating a track with an object measurement using a first tracking module;
    (b) code for determining a track quality measure for the updated track;
    (c) code for, based on the track quality measure, determining whether a second tracking module, remotely located from the first tracking module, should be applied;
    (d) code for, if the second tracking module is to be applied:
        (i) selecting data describing the track and the object;
        (ii) transmitting the selected data to the second tracking module over a network that imposes constraints of at least one of bandwidth and latency; and
        (iii) code for applying the second tracking module to determine the next position of the object in the track.

10. A non-transitory computer readable storage medium having recorded thereon a computer program for directing a processor to execute a method for determining the next position of an object in a track, the computer program comprising:
  (a) code for updating a track with an object measurement using a first tracking module;
  (b) code for determining a track quality measure for the updated track;
  (c) code for, based on the track quality measure, determining whether a second tracking module, remotely located from the first tracking module, should be applied;
  (d) code for, if the second tracking module is to be applied:
    (i) selecting data describing the track and the object;
    (ii) transmitting the selected data to the second tracking module over a network; and
    (iii) code for applying the second tracking module to determine the next position of the object in the track.

* * * * *